United States Patent [19]

Bennett

[11] Patent Number: 4,805,640

[45] Date of Patent: Feb. 21, 1989

[54] STRAW WALKER EXTENSION PAN

[75] Inventor: Robert E. Bennett, Moline, Ill.

[73] Assignee: Deere & Company, Moline, Ill.

[21] Appl. No.: 62,537

[22] Filed: Jun. 12, 1987

[51] Int. Cl.[4] .............................................. A01F 12/30
[52] U.S. Cl. .......................................... 130/26; 130/24
[58] Field of Search ................ 56/14.6; 130/22 R, 24, 130/25, 26, 27 R, DIG. 1, DIG. 6

[56] References Cited

U.S. PATENT DOCUMENTS

| 1,538,665 | 5/1925 | Sinclair | 130/DIG. 6 |
|---|---|---|---|
| 2,574,010 | 11/1951 | Bjorndahl | 130/24 |
| 3,367,496 | 2/1968 | Cockle et al. | 130/24 |
| 3,800,803 | 4/1974 | Rouse | 130/24 |
| 4,480,643 | 11/1984 | Alm | 130/24 |

FOREIGN PATENT DOCUMENTS

| 204958 | 12/1956 | Australia | 130/24 |
|---|---|---|---|
| 480076 | 1/1952 | Canada | 130/24 |
| 1060655 | 4/1954 | France | 130/26 |
| 813413 | 5/1959 | United Kingdom | 130/26 |
| 1412108 | 10/1975 | United Kingdom | 130/24 |

Primary Examiner—John Weiss

[57] ABSTRACT

A straw walker extension pan is mounted to the end of a straw walker trough by two nut and bolt assemblies that engage mounting holes located in the pan and mounting apertures located in the straw walker trough. The pan is further provided with downwardly and forwardly projecting tangs that engage mounting slots located in the straw walker trough.

19 Claims, 2 Drawing Sheets

STRAW WALKER EXTENSION PAN

BACKGROUND OF THE INVENTION

1. Field of the Invention

The invention is directed to an extension pan that is mounted to the end of a straw walker trough by only two nut and bolt assemblies.

2. Description of the Prior Art

In conventional agricultural combines, an agricultural crop is harvested from a field by a harvesting platform and transported by a feeder house assembly to a threshing assembly. The threshing assembly may comprise a transversely mounted threshing cylinder and concave which are used to separate grain from straw. The threshed straw is directed to oscillating straw walkers which throw the straw located thereon backwards until the straw is projected out the rear of the combine. The straw walkers comprise a series of longitudinally extending troughs that are operatively coupled to straw walker cranks for oscillating the troughs. The straw walkers are used for removing residual grain from the threshed straw, as such each trough is provided with a plurality of grain receiving slots through which grain and chaff fall. The grain and chaff are directed to a cleaning shoe for separating the grain from the chaff.

In some crops and crop conditions, it is desirable to increase straw walker capacity by using straw walker extension pans that are bolted onto the end of the troughs. Typically, these extensions are pushed in and bolted in a retracted position when not in use; and unbolted, pulled out, and bolted in an extended position when in use. Each pan is secured to the straw walker trough by four nut and bolt assemblies that must be unbolted and bolted whenever the extension pan is moved.

SUMMARY OF THE INVENTION

The present invention comprises an extension pan that is held in place by only two bolts, and as such the changeover operation is simplified. More specifically, the forward part of the pan is provided with downwardly and forwardly extending tangs that engage diagonal slots formed in the trough. In this way, when extending the pan, the two mounting bolts are released and the pan extended until the tangs engage the slots. The bolts are then rebolted mounting the extended pan to the trough.

DETAILED DESCRIPTION

Figure 1:
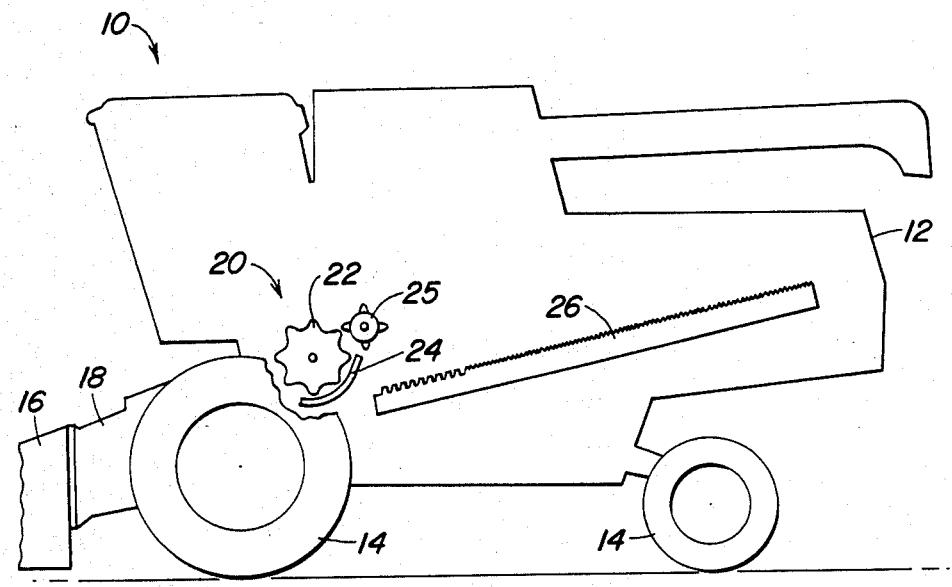
FIG. 1 is a semi-schematic side view of an agricultural combine.
Figure 3:
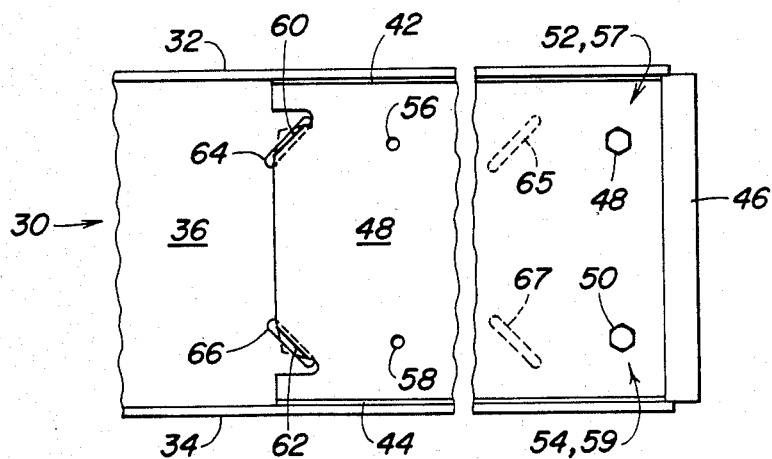
FIG. 3 is a top view of the straw walker extension pan.

FIG. 1 illustrates an agricultural combine 10 having supporting structure 12 which is provided with ground engaging wheels 14. Harvesting platform 16 harvests an agricultural crop which is directed by feeder house 18 to threshing assembly 20. The threshing assembly comprises transverse cylinder 22, associated concave 24 and beater 25. Threshed straw is directed to oscillating straw walker 26 which is used to remove the residual grain trapped in the straw. The residual grain and chaff fall through grain receiving apertures located in the bottom member of the straw walker. The grain and chaff from the straw walkers and the threshing assembly is directed to a cleaning shoe (not shown) for separating the chaff from the grain.

Figure 2A:
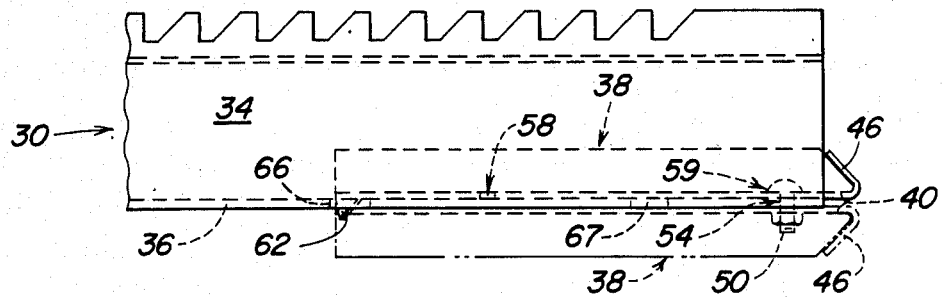
FIGS. 2A and 2B are side views of the straw walker extension pan in its extended and retracted positions.
Figure 2B:
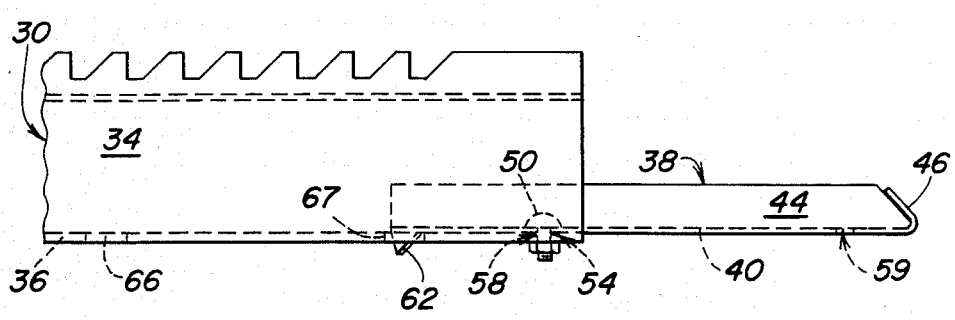

The straw walkers themselves comprise troughs 30 having side members 32 and 34 and bottom member 36. As illustrated in FIG. 2A, the straw walker extension pan 38 can be nested in the trough or mounted under the trough to provide support for the trough. The pan is provided with a bottom plate 40, two side walls 42 and 44 and end wall 46. The bottom plate of the pan is mounted to the bottom member of the trough by nut and bolt assemblies 48 and 50 which pass through mounting apertures 52 and 54 located in the bottom member and mounting holes 56, 57, 58 and 59 located in the bottom plate.

By mounting the extension pan under the straw walker trough in the support mounting configuration reinforcements to the straw walkers do not have to be added when a straw chopper is used. This is especially important when harvesting corn because and unreinforced straw walker trough may become damaged by corn cobs. As such an extension pan of the present invention mounted in this configuration eliminates the necessity of adding an additional reinforcing part.

It should be noted that mounting hole pair 56 and 58 together with the mounting apertures define the retracted position of the pan, whereas mounting hole pair 57 and 59 together with the mounting apertures define the extended position of the extension pan.

The pan is provided with downwardly and forwardly extending diagonal tangs 60 and 62 which are mounted in diagonal mounting slots 64, 65, 66 and 67 located in the bottom member of the trough. In its retracted position, the tangs are located in slots 64 and 66, whereas in its extended position, the tangs are located in slots 65 and 67.

Although the invention has been described as having multiple pairs of mounting holes and a single pair of mounting apertures, it should be noted that such a situation can be reversed; and that the extension pan can be provided with a single pair of mounting holes and the trough with two pair of mounting apertures.

The present invention should not be limited to the above described embodiments, but should be limited solely to the claims that follow.

I claim:

1. A straw walker in an agricultural combine, the straw walker comprising:

an open longitudinal trough having two side members and a bottom member, the trough is adapted and constructed to receive straw and in an oscillating motion propel the straw longitudinally rearward, the bottom member of the trough is provided with at least one mounting aperture and at least two mounting slots;

an extension pan mounted to the trough, the extension pan is provided with a bottom plate that rests against the bottom member of the trough and is provided with at least two mounting holes which together with the mounting aperture of the trough define a pan extended position and a pan retracted position, the pan is further provided with depending engaging means extending from the bottom plate of the pan which cooperate with the mounting slots to further define the extended and retracted positions of the pan; and releasable mounting means engaging the mounting aperture and the mounting holes to mount the pan to the trough in either the retracted position or the extended position.

2. A straw walker as defined by claim 1 wherein the extension pan is provided with two side walls that engage the side members of the trough.

3. A straw walker as defined by claim 2 wherein the depending engaging means comprises downwardly and forwardly extending diagonal tangs which engage the slots.

4. A straw walker as defined by claim 3 wherein the mounting slots are diagonally formed in the bottom member of the trough.

5. A straw walker as defined by clam 4 wherein the releasable mounting means comprises two nut and bolt assemblies.

6. A straw walker extension pan for mounting on an agricultural straw walker, the pan comprising:
   a bottom plate that is adapted and constructed to be mounted to a straw walker trough;
   at least two mounting holes formed in the bottom plate which together with a mounting aperture formed in a straw walker trough define a pan extended position and a pan retracted position; and
   depending engaging means extending from the bottom plate which are adapted and constructed to engage mounting slots located on a straw walker trough further defining the pan extended and retracted positions.

7. A straw walker extension pan as defined by claim 6 wherein the depending engaging means comprises at least one downwardly and forwardly extending diagonal tang.

8. An agricultural combine for harvesting and threshing an agricultural crop, the combine comprising:
   a supporting structure;
   ground engaging means for supporting the supporting structure above a field;
   harvesting means extending from the supporting structure for harvesting an agricultural crop;
   threshing means located in the supporting structure for threshing the harvested agricultural crop;
   feeder house means for transporting a harvested crop from the harvesting means to the threshing means; and
   straw walker means for transporting straw of a threshed agricultural crop out of the combine, the straw walker comprises a plurality of longitudinally extending troughs, each of the throughs having two side members and a bottom member, each bottom member having at least one mounting aperture and at least two slots, in addition each trough is provided with an extension pan comprising a bottom plate having at least two mounting holes which together with the mounting aperture of the trough define a pan extended position and a pan retracted position, the pan is further provided with depending engaging means extending from the bottom plate of the pan which cooperate with the mounting slots further define the extended and retracted positions of the pan, and releasable mounting means engaging the mounting aperture and the mounting holes to mount the pan to the trough in either the retracted position or the extended position.

9. An agricultural combine as defined by claim 8 wherein the extension pan is provided with two side walls that engage the side members of the trough.

10. An agricultural combine as defined by claim 9 wherein the depending engaging means comprises downwardly and forwardly extending diagonal tangs which engage the slots.

11. An agricultural combine as defined by claim 10 wherein the mounting slots are diagonally formed in the bottom member of the trough.

12. An agricultural combine as defined by claim 11 wherein the releasable mounting means comprises two nut and bolt assemblies.

13. A straw walker in an agricultural combine, the straw walker comprising:
   an open longitudinal trough having two side members and a bottom member, the trough is adapted and constructed to receive straw and in an oscillating motion propel the straw longitudinally rearward, the bottom member of the trough is provided with at least two mounting apertures and at least two mounting slots;
   an extension pan is mounted to the trough, the extension pan is provided with a bottom plate that rests against the bottom member of the trough and is provided with at least one mounting hole which together with the mounting apertures of the trough define a pan extended position and a pan retracted position, the pan is further provided with depending engaging means extending from the bottom plate of the pan which cooperate with the mounting slots to further define the extended and retracted positions of the pan; and
   releasable mounting means engaging the mounting apertures and the mounting hole to mount the pan to the trough in either the retracted position or the extended position.

14. A straw walker as defined by claim 13 wherein the extension pan is provided with two side walls that engage the side members of the trough.

15. A straw walker as defined by claim 14 wherein the depending engaging means comprises downwardly and forwardly extending tangs which engage the slots.

16. A straw walker as defined by claim 15 wherein the mounting slots are diagonally formed in the bottom member of the trough.

17. A straw walker as defined by claim 16 wherein the releasable mounting means comprises two nut and bolt assemblies.

18. A straw walker extension pan for mounting on an agricultural straw walker, the pan comprising:
   a bottom plate that is adapted and constructed to be mounted to a straw walker trough;
   at least one mounting hole formed in the bottom plate which together with mounting apertures formed in a straw walker trough define a pan extended position and a pan retracted position; and
   downwardly depending engaging means extend from the bottom plate and are adapted and constructed to engage mounting slots located on a straw walker trough further defining the pan extended and retracted positions.

19. A straw walker extension pan as defined by claim 18 wherein the downwardly depending engaging means comprises at least one downwardly and forwardly extending diagonal tang.

* * * * *